United States Patent Office 3,452,397
Patented July 1, 1969

3,452,397
HYDRAULIC ACTUATOR FOR AN INJECTION MOLDING MACHINE
Russell A. Newton, Rockford, Ill., assignor to Rockford Machine Tool Co., a corporation of Illinois
Filed Oct. 7, 1965, Ser. No. 493,620
Int. Cl. B29f 1/00
U.S. Cl. 18—30                                         23 Claims

ABSTRACT OF THE DISCLOSURE

An actuator for a molding machine including a piston and cylinder device having plural piston areas which in combination with a hydraulic circuit for selectively pressurizing the areas define a plurality of effective piston areas in both the advancing and retracting directions of movement of the piston, with selectively operable pressure relief valves in the hydraulic circuit for varying the force on the piston areas, and also including a toggle mechanism providing a high force clamp.

This invention relates generally to molding machines and more particularly to a hydraulic actuator mechanism and controls for reciprocating one of the platens in an injection molding machine.

In injection molding machines, as well as other types of molding machines such as die casting machines, the mold halves are clamped between two heavy platen members. Conventionally, one of these platen members is movable toward and away from the other platen in rectilinear die opening and closing movements. Hydraulic piston and cylinder devices have been provided for reciprocating the movable platen toward and away from the relatively stationary platen. In the past, however, these piston and cylinder devices have not controlled the movement and force of the movable platen to the extent desirable.

It is therefore a primary object of the present invention to provide a hydraulic piston and cylinder device for advancing and retracting a movable machine member capable of selectively varying the speed and force of the movable machine member during both the advancing and retracting strokes. In injection molding machines it is desirable to provide a rapid approach of the movable platen to reduce the over-all molding cycle time. For this purpose the present piston and cylinder mechanism is effective to advance the platen at a rapid rate under a low force. As the dies approach one another the hydraulic actuator moves the platen at a slow speed under a low force to prevent damage to the dies and the machine. As the dies "kiss," the hydraulic actuator moves the platen at a still slower speed but under a high clamping force to assure the proper closing of the dies. As a high unclamping force is necessary to separate the dies, the hydraulic actuator initially retracts the platen slowly under a high force. After the dies have opened, the platen is withdrawn at a high speed under a relatively lower force. At the end of the retracting stroke the platen is moved slowly under a high force so that the molding may be ejected from the mold.

Another object of the present invention is to provide a new and improved hydraulic actuator of the type described above, having a plurality of effective piston areas to achieve optimum speed and force control in a manner to reduce the horsepower requirements for the actuator. In the present device a compound piston and cylinder mechanism of novel construction is provided having three physically and hydraulically separate piston areas which are selectively connected to a source of hydraulic fluid and a drain by area control valves which provide four effective piston areas, two for the advancing stroke and two for the retracting stroke. The use of this compound piston and cylinder arrangement permits the maximum use of the available hydraulic pump horsepower and increases the available ejection, clamping and decompression forces in an injection molding machine without increasing the over-all cycle time.

A further object of the present invention is to provide a new and improved hydraulic actuator of the type described above for a movable machine member with a control circuit for selectively varying the maximum system pressure and for controlling the volume of flow from the source of hydraulic fluid. A plurality of pressure relief valves are provided connected to the output of two fluid pumps driven by a single motor. These pumps supply hydraulic fluid to the compound cylinder through the area control valves described above. During the high speed close phase one of the pressure relief valves is effective to limit the system pressure to an intermediate value. Another of the pressure relief valves is effective to limit the system pressure to a low value as the dies approach one another so that the movable platen can exert only a relatively small force at this time. As the dies are clamped, a third pressure relief valve limits the system pressure at a high value to achieve a high clamping force. An additional pressure relief valve is provided for diverting the flow of fluid from one of the pumps during the clamping mode to prevent overloading the pump driving motor.

A still further object of the present invention is to provide a molding machine with a hydraulic actuator of the type described above and further including a toggle mechanism connected between the piston and cylinder device and the movable platen to effect the greatest mechanical advantage during clamping while providing a greater platen area for ejection pins than in heretofore known devices of this character. New and improved means are provided for limiting the rate of movement of the platen during unclamping to prevent the toggle linkage from "snapping" and to prevent damage to the molded part during ejection.

Other objects and advantages will become readily apparent from the following detailed description taken in connection with the accompanying drawings, in which.

While the present invention is susceptible of embodiment in many different forms, it should be understood that the present disclosure is to be considered as an exemplification of the principles of the invention and is not intended to limit the invention to the embodiment illustrated. The scope of the invention will be pointed out in the appended claims.

Figure 1:
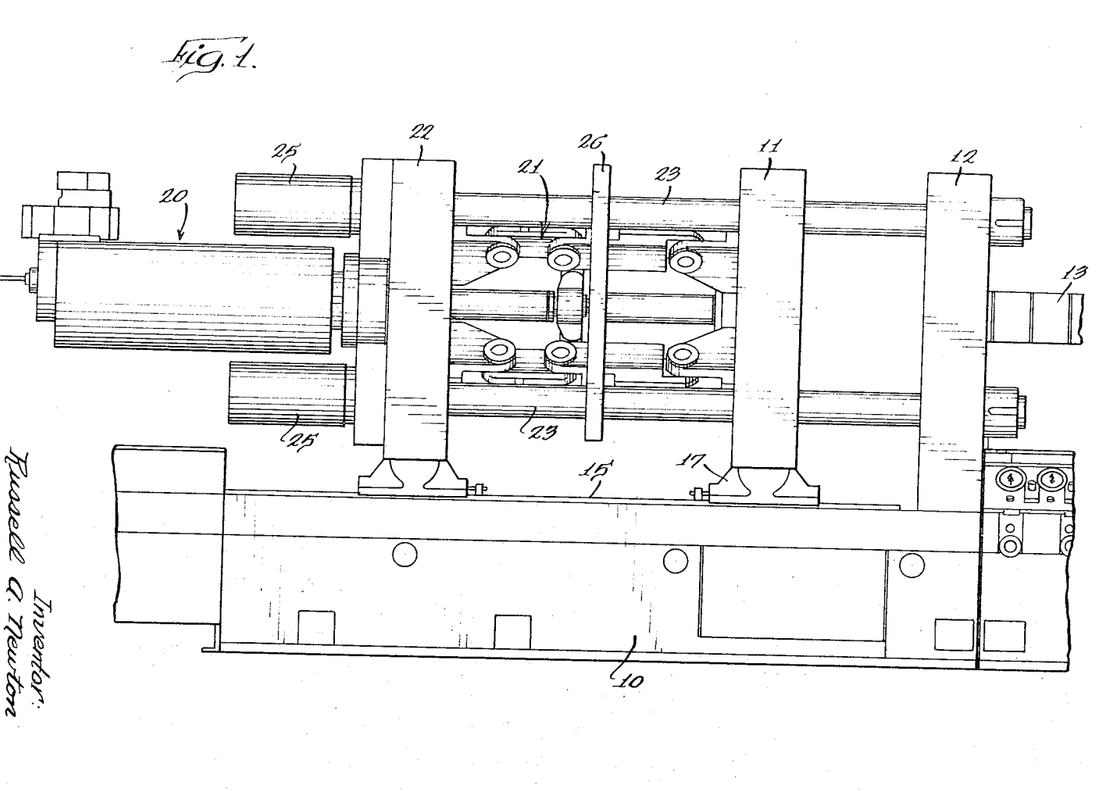
FIG. 1 is a fragmentary elevation of an ejection molding machine incorporating the principles of the present invention.

Referring to FIG. 1, the injection molding machine (only a fragment of which is shown in FIG. 1) is seen to consist generally of a base 10, a movable platen 11, a stationary platen 12, and an injection device 13 (only partly shown) for injecting thermoplastic melt into suitable molds (not shown) mounted between the platens.

The upper surface of the base has suitable longitudinally extending ways 15 which slidably support complementary ways on the underside of movable platen support 17. The stationary platen 12 is rigidly fixed to the base 10 and extends vertically therefrom. Both platens 11 and 12 are generally rectangular in shape.

A hydraulic actuator 20 and a toggle mechanism 21 are provided for reciprocating the movable platen 11 toward and away from the stationary platen 12. The hydraulic actuator 20 is supported in a normally stationary rectangular support member 22 mounted on ways 15. Four tie rods 23 fixed to the stationary platen 12 extend through the movable platen 11 and the normally stationary support 22. These tie rods extend through the corners of the platens to provide maximum die space and support.

Suitable tie rod adjusting devices 25 (described in more detail below) are provided for adjusting the longitudinal position of support 22 to thereby vary the die height or space between the platens 11 and 12. A generally rectangular bumper plate 26 is provided for engaging suitable bumper ejection pins, which extend from the rear of the movable platen 11, at the end of the retracting stroke of the platen. Bumper plate 26 is fixed with respect to the support member 22 and has suitable openings therein for receiving the toggle linkage 21.

While the present invention is shown incorporated into an injection molding machine it should be understood that the principles of the invention apply equally well to a die casting machine.

Figure 2A:
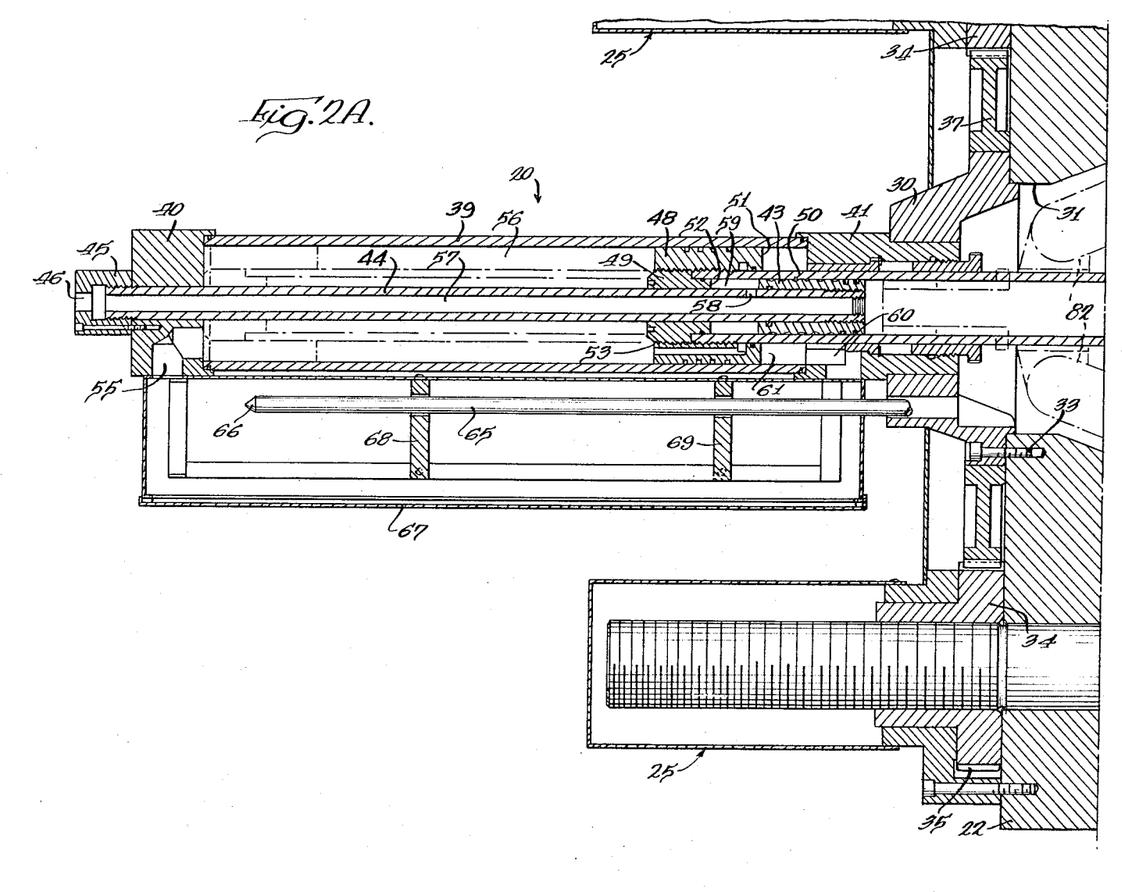
FIGS. 2a and 2b are a cross sectional view of the hydraulic actuator and toggle mechanism.
Figure 2B:
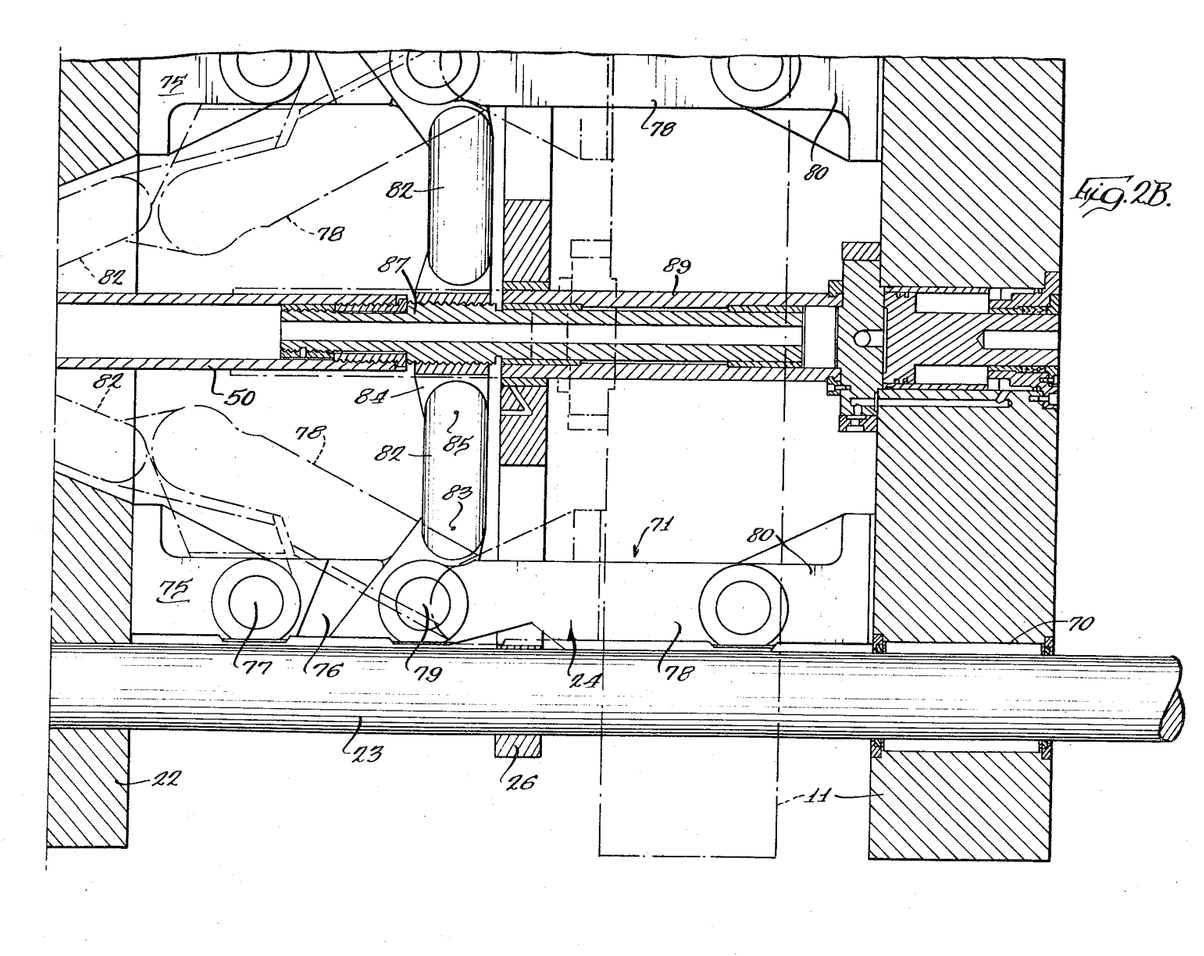

Referring to FIGS. 2a and 2b, the hydraulic actuator 20 is seen to be supported in the normally stationary support 22 by a generally cylindrical boss 30 received in a central opening 31 in the support 22. Boss 30 is fixed to the support by suitable threaded fasteners 33.

The tie rod adjusting assemblies 25 include nuts 34 threaded on the projecting ends of the tie rods and slidably engaging the left face of the support 22 as shown in FIG. 2a. Each nut 34 has gear teeth 35 formed on the periphery thereof which engage a bull gear 37 slidably mounted on the periphery of boss 30. The bull gear 37 is rotated by a suitable adjusting motor. When bull gear 37 rotates, nuts 34 thread on the tie rods moving the normally stationary support 22 on the ways 15 to vary the die height or space between platens 11 and 12.

The hydraulic actuator 20, as shown in FIG. 2a, is seen to consist of a cylinder 39 enclosed by cylindrical end caps 40 and 41. End cap 41 is mounted within a central aperture in boss 30. A stationary piston 43 projects within the cylinder 39 and is supported therein by a hollow rod 44 threaded into a cap 45 fixed on end cap 40. A suitable fluid port 46 is provided in cap 45 which communicates with the interior of rod 44.

The hydraulic actuator 20 further includes a main piston 48 slidable within the cylinder 39. The piston 48 has a hollow plug 49 threaded therein and slidably received on the stationary rod 44. A sleeve-like piston rod 50 is threaded into the other end of main piston 48 and projects from the cylinder through end cap 41. Rod 50 is slidably received on the stationary piston 43. Rod 50 is connected to drive the toggle mechanism 24 in a manner more fully described below.

The piston and cylinder arrangement defines a plurality of piston areas. A first piston area 51 is defined by the inside of the cylinder 39 and the exterior of the rod 50. A second piston area 52 on the plug 49 is defined by the inside of the sleeve 50 and the exterior of the rod 44. A third piston area 53 is defined on the piston and plug 49 by the interior of cylinder 39 and the exterior of rod 44. Piston area 53 is greater than the sum of piston areas 51 and 52 for a purpose described below. A port 55 in end cap 40 communicates with a cylinder chamber 56 to which the piston area 53 is exposed. Port 46, adapted to be connected to a source of fluid or drain, as described below, communicates with piston area 52 through passage 57 in rod 44, port 58 and chamber 59. Port 60 in end cap 41 communicates with piston area 51 and through chamber 61.

The piston areas 51, 52 and 53 are physical areas of the piston which are subjected to supply and drain pressures. The effective piston areas in the present device, which in part determine the rate of movement and force exerted by piston rod 50, are determined by the effective area of piston 48. The term effective area refers to the algebraic sum of the pressurized physical piston areas; with the pressurized physical areas facing away from the direction of motion being plus and those facing towards the direction of motion being minus. For example, assume that area 51 is 5.89 inches, area 52 is 19.01 inches and area 53 is 30.77 inches. If fluid is ported to ports 46, 55 and 60 so that all the piston areas are subjected to supply pressure the effective area of piston 48 would be 5.87 inches, i.e. 30.77 minus 24.90 (5.89 plus 19.01) in a piston advancing direction. Effective piston area is controlled by a control circuit described in more detail below with reference to FIGS. 3 to 7.

The various solenoids in the control circuit described below are actuated by a tail rod or control rod 65 suitably fixed to and carried by the projecting end of piston rod 50. Rod 65 has a camming surface 66 adapted to actuate limit switches (not shown) mounted within a control rod housing 67 fixed to the cylinder end caps 40 and 41. Supports 68 and 69 are mounted within the housing 67 and slidably receive and support the control rod 65. It should be understood that these limit switches are spaced within the housing 67 as desired to sequentially actuate the hydraulic cylinder control at predetermined positions along the length of stroke of the rod 50.

As shown more clearly in FIG. 2b, the movable platen 11 has bore 70 slidably received on the tie rods 23. The toggle mechanism 24 includes four toggle linkages 71. Each toggle linkage 71 extends in a radial plane passing through the center of the adjacent tie bar 23 so that the force from the toggle linkage is exerted on each of the four corners of the platen adjacent the tie bars. Each toggle linkage 71 includes an anchor member 75 fixed to the stationary support 22, and an L-shaped link 76 pivotally mounted on the anchor 75 at 77. A relatively long link 78 is pivotally connected to link 76 at 79 and pivotally connected to an anchor member 80 fixed to the platen 11. The toggle action is controlled by link 82 pivotally connected to the extending leg of link 76 at 83 and one leg of a spider 84 at 85. The spider 84 is threadedly fixed to a threaded extension shaft 87 rigidly connected to piston rod 50. Shift 87 is slidably received in a hollow support member 89 fixed to the movable platen 11. In this manner the shaft 87 through the support 89 assists in aligning and supporting the platen 11 along with the tie bars and toggle linkages.

In should be understood that suitable ejection pins (not shown) are slidably mounted in the movable platen 11 and project from the reaward face thereof so that they may be engaged by the bumper plate 26.

The toggle linkages as shown in full lines in FIG. 2b are in their fully extended or clamp position. At this time, the dies between the platens are clamped together under a high force produced by the toggle linkages; and the tie bars 23 are in tension. The decompression phase of platen movement is effected by withdrawing the piston rod 50 to the left as shown in FIG. 2b. This, of course, requires a high force as the toggle lingages are under compression at that time. As the spider 84 moves to the left, link 82 serves to break the toggle by raising the pivot 79. As the toggle is broken the high compressive force has a tendency to effect very rapid bending of the toggle links. This is controlled by retarding movement of the piston rod 50 at this time as will appear hereinafter. After the toggle is fully broken, rod 50 moves to the left until the toggle links, platen and hydraulic piston assume the retracted position shown in FIGS. 2a and 2b in broken lines. Just prior to the full retracted position, bumper plate 26 engages the ejection pins in platen 11 and knocks the molding from the die.

As shown in FIGS. 3 to 7, a hydraulic control circuit is provided for selecting the effective area of piston 48, selectively varying the maximum pressure of fluid supplied to the hydraulic cylinder 39, and for selectively restricting the flow of fluid from the cylinder during certain portions of the machine cycle.

Figure 3:
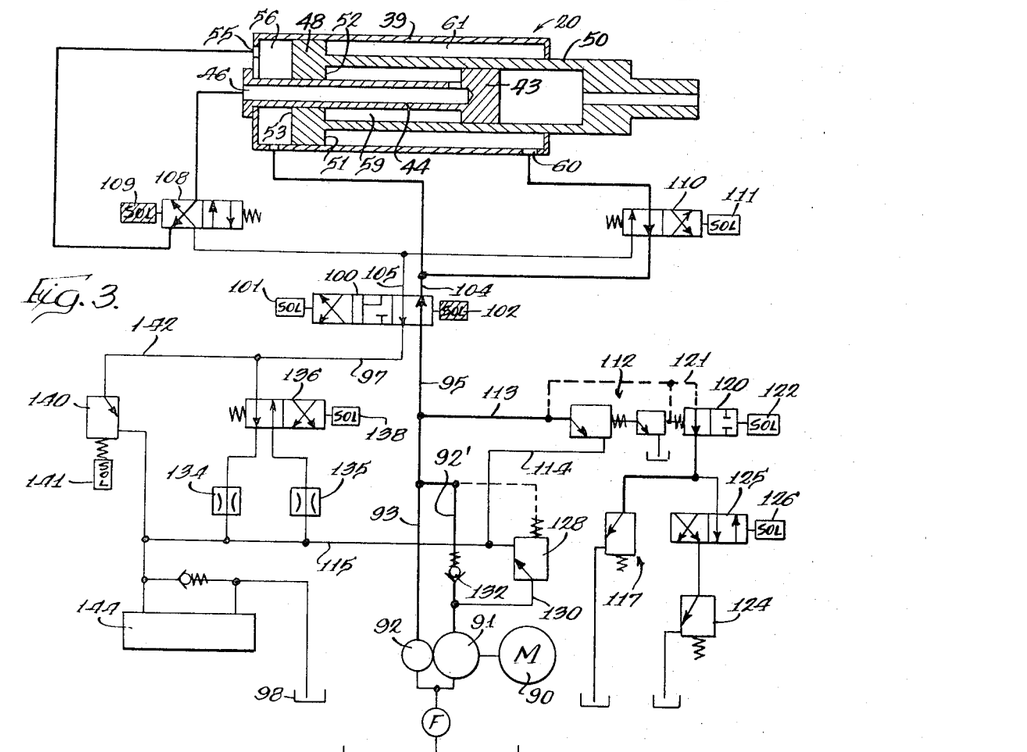
FIGS. 3 to 7 are schematic illustrations of the hydraulic piston and cylinder device and the control circuit in various control positions in both the advancing and retracting strokes.

As is shown in FIG. 3, an electric motor 90 is provided for driving pumps 91 and 92. In one exemplary construction of the present device motor 90 was 20 horsepower and pumps 91 and 92 and 21 and 11 gallon per minute capacities, respectively. It should be understood however, that these sizes as well as the other dimensions referred to herein are exemplary for one size machine and that these dimensions may be varied depending upon the capacities desired. Pumps 91 and 92 supply fluid to a main fluid source line 95 through lines 92' and 93, respectively. A drain or return conduit 97 is provided for carrying discharge fluid from the hydraulic cylinder to a suitable tank 98. A directional control valve 100, selectively actuable by solenoids 101 and 102, is operable to selectively connect the supply and the drain conduits 95 and 97 to a piston advance conduit 104 or a piston retract conduit 105. When both solenoids 101 and 102 are deenergized, valve 100 moves to its central positon with both lines 104 and 105 connected to tank 98.

Figure 6:
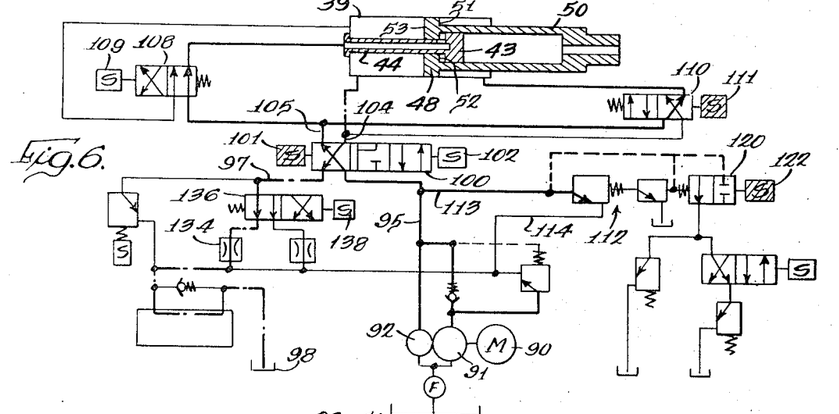

A first area control valve 108 is provided for selectively connecting chamber 59 with either chamber 56 or the retract line 105. Valve 108 is controlled by solenoid 109. A second area control valve 110, actuable by solenoid 111, is provided for selectively connecting the chamber 61 with the chamber 56 (as shown in FIG. 3) or with the chamber 59 (as shown in FIG. 6).

A high pressure relief valve assembly 112 is provided for limiting the pressure in source line 95 to a maximum value during the clamping phase of the advancing stroke and during the entire retracting stroke. If the pressure in line 95 exceeds this maximum value, which in the one construction referred to above was 1800 p.s.i., a portion of the fluid in line 95 is diverted through line 113, relief line 114 and drain line 115 to the tank 98. An intermediate pressure relief valve 117 is provided for limiting the pressure in source line 95 during the high speed advancing stroke of the piston rod 50. In the construction referred to, relief valve 117 was set to limit the pressure in line 95 to 1,000 p.s.i. A blocking valve 120 is provided in line 121 for selectively isolating the relief valve 117 so that only the high pressure relief valve 112 limits system pressure. Valve 120 is selectively operable by solenoid 122.

A third low pressure relief valve 124 is proveded for selectively limiting the fluid pressure in source line 95 to a pressure below the relief pressures of valves 112 and 117. Relief valve 124 is effective during the low pressure close phase of the cycle. This valve was on the order of 450 p.s.i. in the construction referred to above. A selectively operable blocking valve 125, actuable by solenoid 126, isolates the low pressure relief valve 124 from valves 112 and 117. It should be understood that valves 112, 117 and 124 are connected in parallel with the source line 95 so that by selective actuation of solenoids 122 and 126 any one of the relief valves may be effective to limit the source pressure.

A pressure relief valve 128 is provided for diverting flow from the larger capacity pump 91 during the high pressure clamping movement of the actuator 20. Because the forces during clamping are high, system pressure builds up at this time. If the motor 90 was then required to drive both pumps 91 and 92 at full capacity a larger motor would be required. By diverting the flow from the pump 91 during this portion of the cycle a smaller motor may be employed. Relief valve 128 was set at 1100 p.s.i. in the exemplary construction noted above. When the pressure increases above this value, flow from pump 91 is temporarily diverted through line 130, relief valve 128, and the discharge line 115 to the tank 98. A check valve 132 in line 92' prevents back flow from the source line at the time.

To assist in controlling and retarding the speed of the actuator 20 during the unclamping (decompression of the platens, a restricted passage 134 is provided for restricting discharge flow through passage 97. Another restricted passage 135 is provided for regulating discharge flow through passage 97 during the ejection phase of the machine cycle. Restricted passages 134 and 135 may be variable flow control valves adjustable as desired to vary the speed of the piston rod 50 during the respective portions of the machine cycle. A selectively operable valve 136 is provided for connecting either of the restricted passages 134 or 135 to the discharge conduit 97. Valve 136 is actuated by a solenoid 138.

A high pressure relief valve 140 is provided in the discharge conduit 97 in parallel with the restricted passages 134 and 135. Relief valve 140 prevents excessive discharge pressures. This valve was set on the order of 2700 p.s.i. for the exemplary construction noted. In addition to its pressure relief function, valve 140 is actuable by solenoid 141 to permit unrestricted discharge flow through line 142 during the rapid retraction phase of the machine.

A heat exchanger 144 is provided in the discharge conduit for cooling the discharge flow.

It should be understood that the solenoids in FIG. 3 are actuated by limit switches described above which are sequentially actuable by the control rod 65 within the control housing 67 as shown in FIG. 2a.

The operation of the device will be described with reference to FIGS. 3 to 7. It should be understood that a suitable electric circuit (not shown) may be provided for starting and stopping the cyclical operation of the actuator 20 and for stopping it at some intermediate portion of the stroke. When the injection molding machine is idling with motor 90 running, all the solenoids are deenergized. The directional control valve 100 is then in its centered position (not shown) where it blocks flow from the source line 95 and connects the advancing and retracting passages 104 and 105 to discharge line 97. As flow from the source line 95 is blocked, the bulk of the flow from the pumps 91 and 92 passes over relief valve 112 to tank, through line 114. The remainder passes through lines 113 and 121, valve 125 and over the low pressure relief valve head 124 to tank.

When it is desired to start the cyclical operation of the actuator 20, solenoids 102, 109 and 126 are energized by the electric control circuit. These solenoids may be initially actuated by the closing of the safety gate on the machine. However, the subsequent deenergization and energization of these solenoids are controlled by limit switches actuated by the control rod 65 so that the reciprocation of actuator 20 is cyclical, i.e. continues automatically. With the solenoid 102 energized the directional control valve 100 ports source fluid to chamber 61 and chamber 56 subjecting piston areas 51 and 53 to source pressure as shown in FIG. 3. At the same time valve 108 actuated by the energized solenoid 109, connects chamber 56 with chamber 59 so that piston area 52 is also subjected to source fluid pressure. The effective piston area at this time is the area 53 less the sum of areas 51 and 52. As area 53 is greater than the sum of areas 51 and 52 the effective piston area will be in an advancing direction and will be relatively small. For the exemplary piston areas noted above, the effective piston area selected during this phase would be 5.87 square inches.

With solenoid 126 energized the relief valve 117 becomes operative and limits source pressure in line 95 to the intermediate value, e.g. 1000 p.s.i. Piston rod 50 then begins its rapid advancing movement to the right as shown in FIG. 3. The fluid in chambers 59 and 61 passes through the associated area control valves 108 and 110, respectively, to the chamber 56. Because of the small effective piston area and the intermediate pressure in line 95, piston rod 50 moves at a rapid rate under relatively low force. The force exerted by the piston rod 50 on the movable platen 11 through the toggle linkage is only enough to keep the platen moving at this relatively high speed. In this manner the maximum available horsepower is used while providing maximum protection to the dies in the machine.

Figure 4:
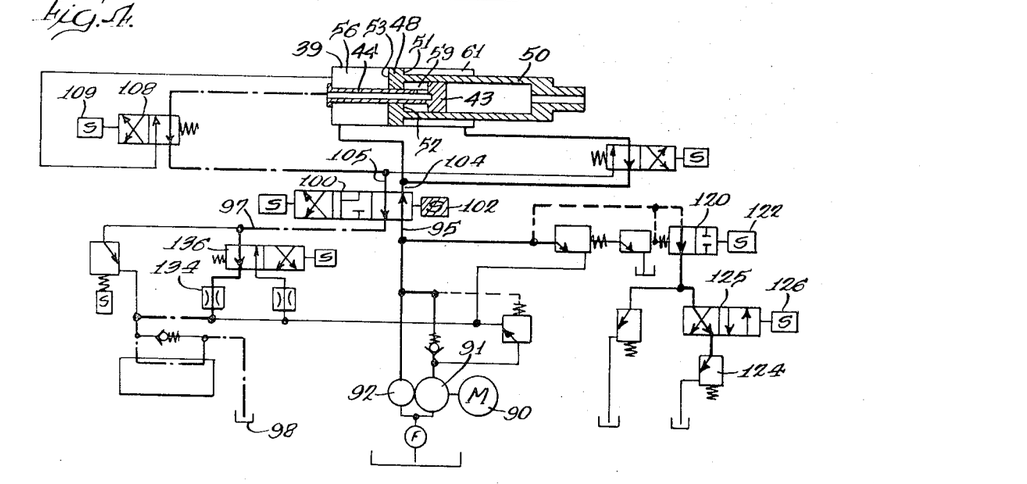

At a point short of die "kiss" or contact, the control rod 65 releases a limit switch which deenergizes solenoids 109 and 126 and the hydraulic circuit assumes the low pressure close position shown in FIG. 4. The area control valve 108 connects chamber 59 to the retracting line 105 which at this time communicates with discharge passage 97 through the directional control valve 100. The effective piston area is still in an advancing direction and is equal to the area 53 less the area 51, e.g. 11.76 square inches. This increase in the effective piston area decreases the rate of movement of the piston rod 50. With solenoid 126 deenergized the low pressure relief valve 124 limits pressure in source line 95 to the low value, e.g. 450 p.s.i., to assure that piston rod 50 will move under a low force to prevent damage to the dies and the machine at this time. As valve 108 shifts, while the piston rod 50 is advancing rapidly, a braking effect is produced and rod 50 then begins movement at a new low speed under a low fluid pressure thereby producing an effective low pressure die close. If the platen 11 encounters a resistance above the normal closing force the platen will stop providing maximum protection to the die faces and machine.

Figure 5:
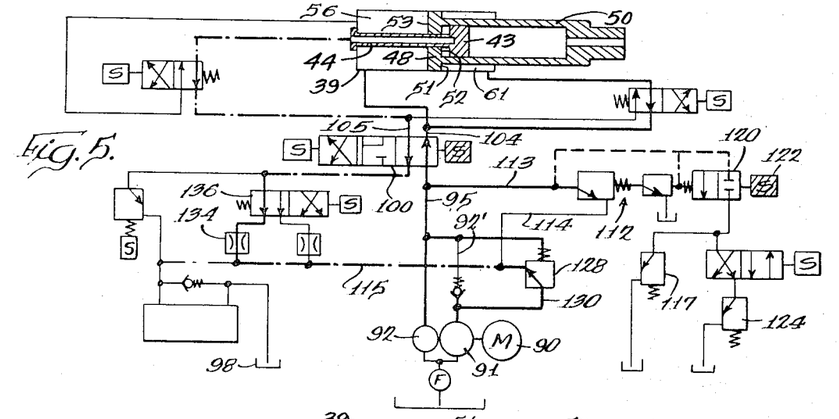

As the die faces contact or "kiss," the control rod 65 releases another limit switch (not shown) which energizes solenoid 122 and the control circuit assumes the clamping position shown in FIG. 5. In this position the effective area remains the same as in the low pressure close position shown in FIG. 4, that is the effective area is area 53 minus area 51. This provides a relatively large effective piston area for slow movement of the rod 50 under high force. With solenoid 122 energized, the intermediate and low pressure relief valves 117 and 124 are isolated from the source line 95 so that the high pressure relief valve 112 limits the pressure in source line 95 to the maximum value, e.g. 1800 p.s.i. This high pressure on the relatively large effective piston area, in addition to the high mechanical advantage of the toggle linkage at this time, which may be 56:1, provide a low speed and high force clamping phase for the platens and dies. As the toggle links are "humped" by the movement of piston rod 50, the piston rod 50 begins its clamping movement at a slower speed than during the low pressure close phase. During this clamping phase the larger capacity pump 91 discharges through the relief valve 128 to the tank 98. As the mechanical advantage of the toggle increases the pressure requirements drop below the setting of relief valve 128, e.g. 1100 p.s.i., and the pump 91 returns to the circuit to complete the clamping phase.

When the clamping phase is completed, the flow from pump 91 is again diverted to the tank through relief valve 128.

At the end of the clamping phase the melt injection cycle is started. At the end of the injection cycle a suitable cycle timing device initiates the decompression or retracting phase by energizing solenoids 101 and 111, and deenergizing solenoid 102, as shown in FIG. 6. With solenoid 111 energized, area control valve 110 connects chamber 61 and chamber 59 with the retracting line or conduit 105. When solenoid 111 is energized and solenoid 109 is denergized in this phase the effective piston area is the sum of areas 51 and 52, e.g. 24.9 square inches. The directional control valve 100 connects the retracting line 105 to the fluid source line 95, and the advancing line 104 to the tank 98 through the restricted passage 134. Solenoid 122 remains energized so that the high pressure relief valve 112 limits system pressure to the maximum value, e.g. 1800 p.s.i.

Fluid then flows from both pumps through valves 108 and 110 to chambers 59 and 61 respectively. With the high available pressure and the large effective piston area a high force is available. This high available force may be necessary to part the dies or molds after casting. During decompression the stored energy of compression reacts on the piston rod 50 forcing it in the open direction. To control the speed of the rod 50 at this time, the discharge flow from chamber 56 is restricted in the restricted passage 134 thereby retarding the movement of the piston to prevent snapping of the toggle linkage.

Figure 7:
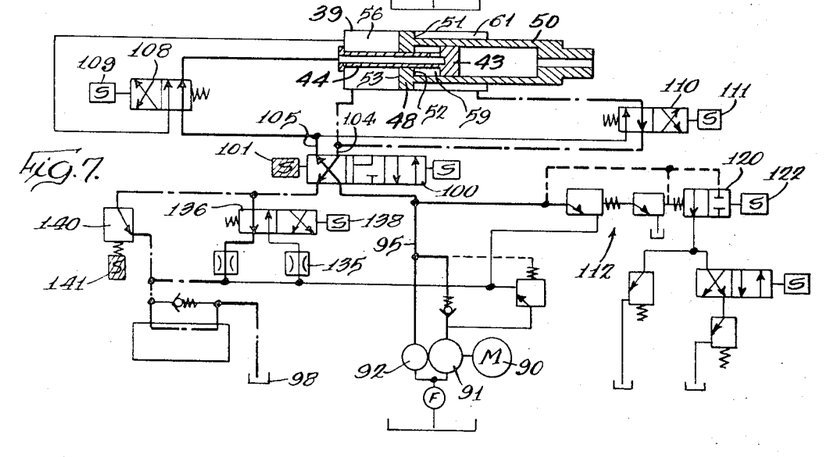

After die parting and decompression has been completed, the control rod 65, contacts a limit switch (not shown) which deenergizes solenoids 111 and energizes solenoid 141 as shown in FIG. 7. Cylinder chambers 56 and 61 are connected to drain passage 97 through the area control valve 110 and the directional control valve 100. In this phase the effective area of piston 48 is that of area 52 alone as this is the only pressurized area on the piston at this time. Area 52 is 5.89 inches in the example given. Fluid from both pumps 91 and 92 pass through valves 100 and 108 to chamber 59 and the piston 50 begins its rapid retraction phase at a high speed under a low force. A large proportion of the discharge flow from chamber 56 passes through the valve 140 which is restricted at this time, thereby super charging chamber 61 with positive pressure thereby permitting high speed retraction of the platen 11.

If desired, a limit switch may be provided in a position to be actuated by the control rod 65 in the middle of the high speed retraction phase to produce a mid-die stop. This limit switch would denergize solenoid 101 so that the directional control valve would port all the cylinder chambers to tank thereby stopping the press. At this time, core pulls may be accomplished if necessary.

At the end of the high speed retraction phase, the control rod 65 contacts another limit switch (not shown) energizing solenoid 111 and solenoid 138, and deenergizing solenoid 141. This is the ejection phase position of the hydraulic circuit. A separate drawing for this position is not shown but reference may be made to FIG. 7 with the solenoids therein in the state indicated above. With solenoid 111 energized and solenoid 109 deenergized, the area control valves select the maximum effective piston area equal to the sum of areas 51 and 52, e.g. 24.9 square inches. The system pressure is limited to the maximum value determined by pressure relief valve 112. With solenoid 138 energized and solenoid 141 deenergized discharge flow from cylinder chamber 56 passes through valve 136 and the restricted passage 135 to tank. The large effective piston area and high available pressure provide a maximum ejection force for knocking the part out of the die. The restricted passage 135 assures the slow movement of piston 50 at this time to prevent damage to the part being ejected. Alternatively, if a lower ejection force is desired solenoid 111 could be deenergized at this time so that the effective piston area would be smaller, i.e. the same as in the high speed open phase described above. However, the piston rod 50 would move at a slow speed because discharge flow is restricted by passage 135. In the example given the ejection forces for the large and small areas would be 34,860 pounds and 8,500 pounds, respectively.

The cycle is then complete and the next cycle begins with the high speed advancing stroke.

I claim:
1. A hydraulic actuator for a movable machine member having an advancing and retracting movement, comprising; a hydraulic cylinder mechanism including a cylinder member, a piston member slidable in said cylinder member and defing first and second chambers therein, one of said members adapted to be connected to the movable machine member, axialy extending conduit means in said cylinder extending through said piston and having a port at the end thereof within the cylinder, a piston rod sleeve connected to said piston and surrounding said conduit means, said piston rod and conduit defining in said second chamber a first piston surface between the rod and the cylinder and a second piston surface between the rod and the conduit, both said first and said second piston surfaces facing in the same direction, said conduit defining in said first chamber a third piston surface between the conduit and the cylinder, said third piston surface being larger than the sum of the first and second piston surfaces; and a hydraulic control circuit for advancing and retracting said cylinder mechanism including means for supplying hydraulic fluid under pressure, first means for communicating said supply fluid to all of said piston surfaces to provide a first relatively small effective piston area for rapidly advancing said one member under a low force, said first means including means for conveying fluid from the second chamber adjacent both said first and said second surfaces to said first chamber, second means for selectively communicating said first and third surfaces with said supply means and said second surface with a drain to provide a second effective piston area larger than said first piston area for slowly feeding said one member under a low force, said second means including means for limiting the supply pressure to a low pressure value, third means for maintaining said second means effective piston area for slowly advancing said one member under a high force, said third means including means for limiting the supply pressure to a predetermined maximum value and means for diverting a portion of the supply fluid in response to a supply pressure in excess of said maximum value, fourth means for communicating said supply fluid with said first and second piston surfaces and for communicating said third surface with the drain to provide a relatively large effective piston area for slowly retracting said one member a predetermined distance under a high force, said fourth means including means for maintaining said maximum supply pressure, and fifth means for communicating said second piston surface with said supply fluid and communicating said first and third piston surfaces with the drain to provide a relatively small effective piston area for rapidly retracting said one member.

2. A hydraulic actuator for a movable machine member having an advancing stroke and a retracting stroke, comprising: a cylinder member, a piston member slidable within said cylinder member, said piston member being constructed to define first and second effective piston areas for the advancing stroke and first and second effective piston areas for the retracting stroke, said first areas being of different size than said second areas; and hydraulic control means for selectively supplying fluid to said first or said second advancing piston areas and to said first or said second retracting piston areas to vary the rate of movement, force, and direction of one of said members.

3. A hydraulic actuator as defined in claim 2, wherein said means for supplying fluid to the respective piston areas includes a source of fluid under pressure, and means for selectively porting fluid from said source to the first advancing piston area for moving said one member at a first advancing speed, to the second advancing piston area for moving said one member at a second advancing speed, to the first retracting piston area for moving said one member at a first retracting speed, and to the second retracting piston area for moving said member at a second retracting speed.

4. A hydraulic actuator for a movable machine member having an advancing stroke and a retracting stroke, comprising: a cylinder member, a piston member slidable within said cylinder member, said piston member being constructed to define first and second effective piston areas for the advancing stroke and first and second effective piston areas for the retracting stroke, said first areas being of different size than said second areas; hydraulic control means for selectively supplying fluid to said piston areas to vary the rate of movement, force, and direction of one of said members, said means for supplying fluid to the respective piston areas including a source of fluid under pressure, means for selectively porting fluid from said source to the first advancing piston area for moving said one member at a first advancing speed, to the second advancing piston area for moving said one member at a second advancing speed, to the first retracting piston area for moving said one member at a first retracting speed, and to the second retracting piston area for moving said member at a second retracting speed, said first advancing piston area being smaller than said second advancing piston area, and said first retracting piston area being larger than said second retracting piston area; said hydraulic control means including means for limiting the pressure of the supply fluid to said second advancing piston area to a predetermined value so that said one member travels at a slow rate under a relatively low force, and means for limiting the pressure of the supply fluid to said first retracting piston area to a predetermined maximum value above said predetermined value so that said member initially retracts at a slow rate under a high force.

5. A hydraulic actuator for a movable machine member having an advancing stroke and a retracting stroke, comprising: a cylinder member, a piston member slidable within said cylinder member, said piston member being constructed to define first and second effective piston areas for the advancing stroke and first and second effective piston areas for the retracting stroke, said first areas being of different size than said second areas; hydraulic control means for selectively supplying fluid to said piston areas to vary the rate of movement, force, and direction of one of said members, said means for supplying fluid to the respective piston areas including a source of fluid under pressure, means for selectively porting fluid from said source to the first advancing piston area for moving said one member at a first advancing speed, to the second advancing speed, to the first retracting piston area for moving said one member at a first retracting speed, and to the second retracting piston area for moving said member at a second retracting speed, and further including a third effective advancing piston area, said hydraulic control including means for selectively porting supply fluid to said third advancing piston area, said first advancing piston area being smaller than said second and third advancing piston areas so that said one member will initially advance at a rapid rate under a low force, said first retracting piston area being larger than said second retracting piston area so that said member will initially retract at a slow rate under a large force.

6. A hydraulic actuator as defined in claim 5, wherein said hydraulic control means includes means for limiting the pressure of supply fluid to said second advancing piston area to a predetermined low value to prevent damage to the machine, and means for limiting the pressure of supply fluid to said third advancing piston area to a predetermined maximum value above said predetermined value to produce a high force on said one member at this time without overloading the source of supply.

7. A hydraulic actuator as defined in claim 5, wherein said source of supply fluid includes a first pump and a second pump, a motor for driving both of said pumps, and means for diverting the fluid from the second pump when the pressure of that fluid exceeds a predetermined value whereby the motor is not overloaded when said members encounters a high resistance.

8. In a molding machine, the combination comprising: a base, a fixed platen on said base, a movable piston slidably mounted on said base for movement toward and away from said fixed platen, a hydraulic cylinder device for reciprocating said movable platen including a cylinder member, a piston member slidably mounted in said cylinder member, said piston and cylinder members being constructed to define a plurality of piston areas on said piston member, a hydraulic control means for selectively porting fluid to said piston areas to vary the speed and force of the movable platen during its advancing and retracting strokes including means for simultaneously pressurizing all of said platen areas, said piston member having hydraulically separate first and second piston areas on the retraction side thereof and a third piston area on the advancing side thereof, said third piston area being greater than the sum of the first and second piston areas.

9. In a molding machine as defined in claim 8, wherein said hydraulic control includes valve means for porting supply fluid to all of said piston areas to advance said movable platen at a high speed under a low force.

10. In a molding machine as defined in claim 9, wherein said hydraulic control includes valve means for porting supply fluid under a predetermined low pressure to said first and third piston areas and from said second piston area to provide a low speed and low force approach of the movable platen, valve means for porting supply fluid under a predetermined maximum pressure above said predetermined low pressure to said first and third piston areas and for porting fluid from said second piston area to provide a low speed and high force clamping movement of the movable platen.

11. In a molding machine as defined in claim 10, wherein said hydraulic control includes valve means for porting fluid under pressure to said first and second piston areas to provide a low speed and high force ejection cycle during the retracting stroke of the movable platen.

12. In a molding machine as defined in claim 9, wherein said hydraulic control includes valve means for porting fluid to said second piston area and from said first and third piston areas to provide a high speed low force retraction stroke for the movable platen.

13. In a molding machine as defined in claim 10, wherein said hydraulic control includes valves means for porting fluid under said predetermined maximum pressure to said first and second piston areas and from said third piston area to provide a low speed and high force unclamping of the platens.

14. In a molding machine as defined in claim 13, and further including a toggle mechanism interconnecting one of said members and said movable platen.

15. In a molding machine as defined in claim 8, wherein said hydraulic control includes valve means for selectively connecting each piston area with the other piston areas to vary the size and direction of the effective piston area.

16. In a molding machine as defined in claim 8, wherein said hydraulic control includes a supply line and a return line, an advancing line in said cylinder communicating with said third piston area, a retracting line selectively connectable with said first and second piston areas, a directional control valve for selectively connecting said advancing and retracting lines to said supply and return lines to effect movement of the movable platen toward and away from the fixed platen, a first area control valve for selectively connecting the second piston area to the third piston area and the retracting line, and a second area control valve for selectively connecting the third piston area to the advancing line and the retracting line.

17. In a molding machine as defined in claim 16 and further including a plurality of selectively actuatable pressure relief valves connected to said supply line including a low pressure relief valve actuatable during the closing of said platen to prevent damage to the mold, a high pressure relief valve actuatable during the clamping of the platens to provide a high clamping force, and a medium pressure relief valve actuatable during the high speed advance of the movable platen.

18. In a molding machine as defined in claim 16, wherein said hydraulic control includes two selectively operable restricted passages in said return line for respectively retarding movement of the movable platen during clamping and unclamping, and for retarding movement of the movable platen during ejection.

19. In a molding machine as defined in claim 18 further including a selectively operable bypass around said restricted passages to permit unretarded high speed movement of the platen.

20. In a molding machine as defined in claim 17, wherein said source of supply includes a first pump, a second pump, and a motor driving both of said pumps, separate conduits connecting the output of each pump to the supply line, a pressure relief valve in one of said pump conduits, said pressure relief valve being constructed to divert the flow from the associated pump at a pressure below said high pressure value and above said medium pressure value of said selectively actuatable relief valves so that the flow from the pumps is reduced during part of the clamping cycle to prevent overloading the motor.

21. A hydraulic actuator for a movable machine member having an advancing stroke and a retracting stroke, comprising: a cylinder member, a piston member slidable within said cylinder member, said piston member having a first piston area on one side thereof when pressurized tending to move said piston in one direction, said piston member having second and third piston areas on the other side thereof when pressurized tending to move the piston member in the other direction, and means for moving said piston member in one of said directions including common means for simultaneously pressurizing said first piston area and at least one of said second and third piston areas, said presurized one of said second and third piston areas being smaller than said first piston area.

22. A hydraulic actuator a defined in claim 21, wherein said means for moving said piston member in said one direction at a relatively fast rate includes common means for pressurizing all of said piston areas whereby fluid from the contracting areas is fed to the expanding areas.

23. A hydraulic actuator as defined in claim 21, including means for pressurizing said first area and one of said second and third areas and depressurizing the remaining area during the advancing stroke, and means for selectively limiting the pressure on said pressurized areas to a predetermined low value or to a predetermined high value to achieve either a low force movement or a high force movement of the piston.

References Cited

UNITED STATES PATENTS

| 2,498,264 | 2/1950 | Goldhard | 18—30 |
| 2,664,859 | 1/1954 | Green | 92—108 X |
| 2,880,461 | 4/1959 | Gaspar et al. | 18—30 |
| 3,068,841 | 12/1962 | Robbins et al. | 91—447 X |
| 3,245,122 | 4/1966 | Maurer | 18—30 |
| 2,191,882 | 2/1940 | Ernst et al. | 18—30 |
| 2,622,288 | 12/1952 | Venus | 18—30 |
| 2,780,836 | 2/1957 | Morin | 18—30 |
| 3,084,512 | 4/1963 | Huelskamp | 18—30 |
| 3,183,556 | 5/1965 | Studli | 18—30 |

FOREIGN PATENTS

| 1,016,636 | 10/1957 | France. |
| 665,494 | 6/1963 | Canada. |

WILBUR L. McBAY, *Primary Examiner.*

U.S. Cl. X.R.

18—16; 91—28, 216, 416, 436; 92—108; 100—273; 164—339